United States Patent
Lee et al.

(10) Patent No.: US 7,429,980 B2
(45) Date of Patent: *Sep. 30, 2008

(54) OSCILLATION AND ROTATION METRIC CONTROLLER

(75) Inventors: Wen-Chin Lee, Taipei (TW); Hsiang-Kuang Chen, Taipei (TW)

(73) Assignees: Sunrex Technology Corp., Taichung Hsien (TW); Gimbal Technology Co., Ltd., Taipei (TW)

( * ) Notice: Subject to any disclaimer, the term of this patent is extended or adjusted under 35 U.S.C. 154(b) by 602 days.

This patent is subject to a terminal disclaimer.

(21) Appl. No.: 10/991,419

(22) Filed: Nov. 19, 2004

(65) Prior Publication Data

US 2006/0109246 A1  May 25, 2006

(51) Int. Cl.
| | |
|---|---|
| G09G 5/00 | (2006.01) |
| G09G 5/08 | (2006.01) |
| G06F 3/033 | (2006.01) |
| G01B 7/14 | (2006.01) |
| G01B 7/30 | (2006.01) |
| G01R 33/06 | (2006.01) |
| H01L 43/06 | (2006.01) |

(52) U.S. Cl. ............... 345/184; 324/207.2; 324/207.23; 324/207.24; 324/207.25; 345/157; 345/158; 345/163; 345/164; 345/165

(58) Field of Classification Search ............. 324/207.2, 324/207.23–207.25; 345/156–161, 163–167, 345/184

See application file for complete search history.

(56) References Cited

U.S. PATENT DOCUMENTS

| | | | |
|---|---|---|---|
| 7,208,942 B2 * | 4/2007 | Lee et al. ............... 324/207.25 |
| 2005/0264520 A1 * | 12/2005 | Wang ........................ 345/156 |
| 2006/0114228 A1 * | 6/2006 | Lee et al. .................... 345/163 |
| 2006/0114229 A1 * | 6/2006 | Lee et al. .................... 345/163 |
| 2006/0114230 A1 * | 6/2006 | Lee et al. .................... 345/165 |

* cited by examiner

*Primary Examiner*—Sumati Lefkowitz
*Assistant Examiner*—Alexander S Beck
(74) *Attorney, Agent, or Firm*—Leong C. Lei

(57) ABSTRACT

An oscillation and rotation metric controller comprised of a scrolling wheel mechanism to oscillate for driving magnetic poles of a permanent magnet to displace thus to generate signals of changed magnetic field, signals being retrieved to achieve lateral oscillation metric control; and a knob switch encoder being fixed to the scrolling wheel mechanism to execute metric control by rotation displacement.

3 Claims, 8 Drawing Sheets

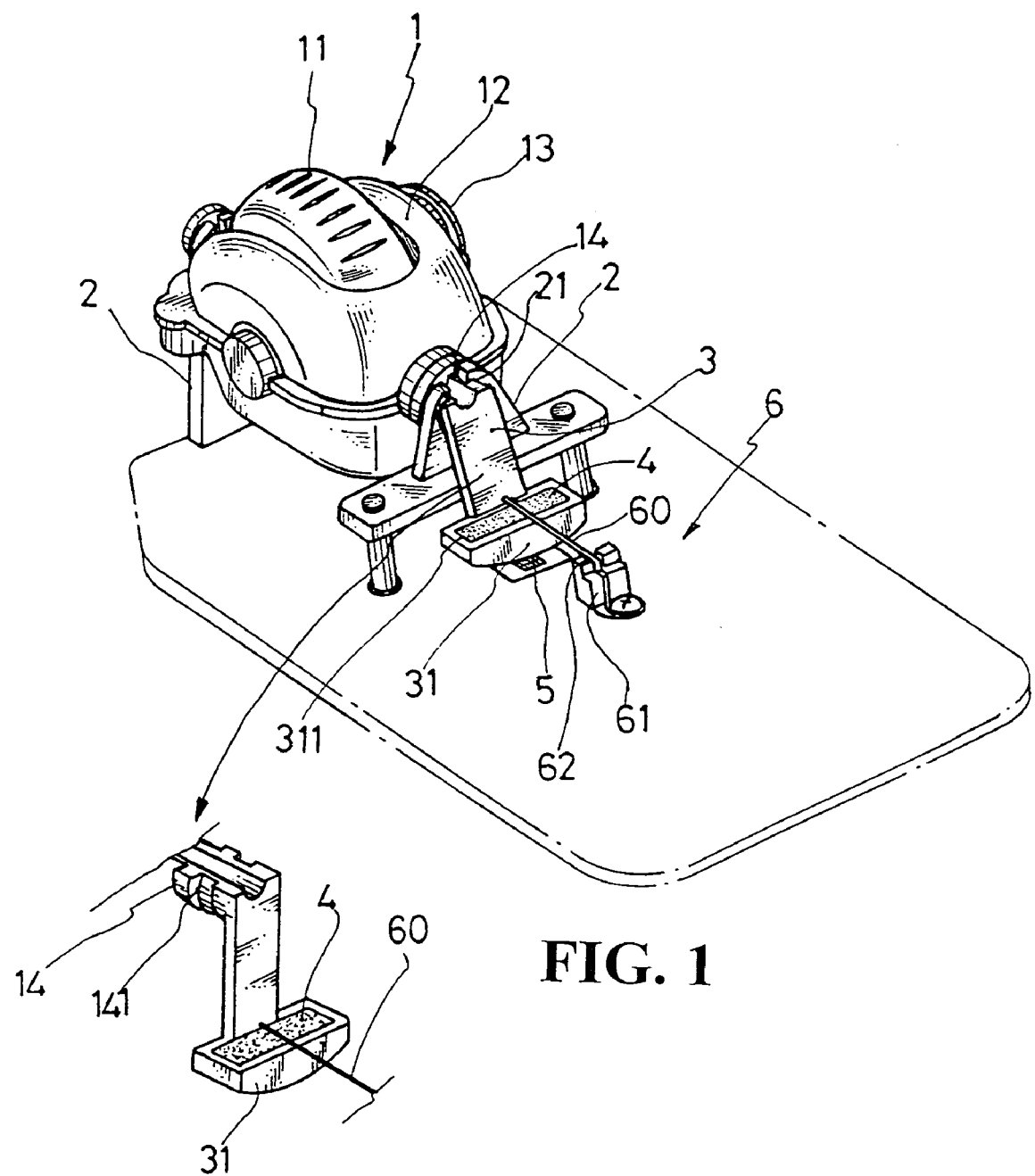
FIG. 1
FIG. 2

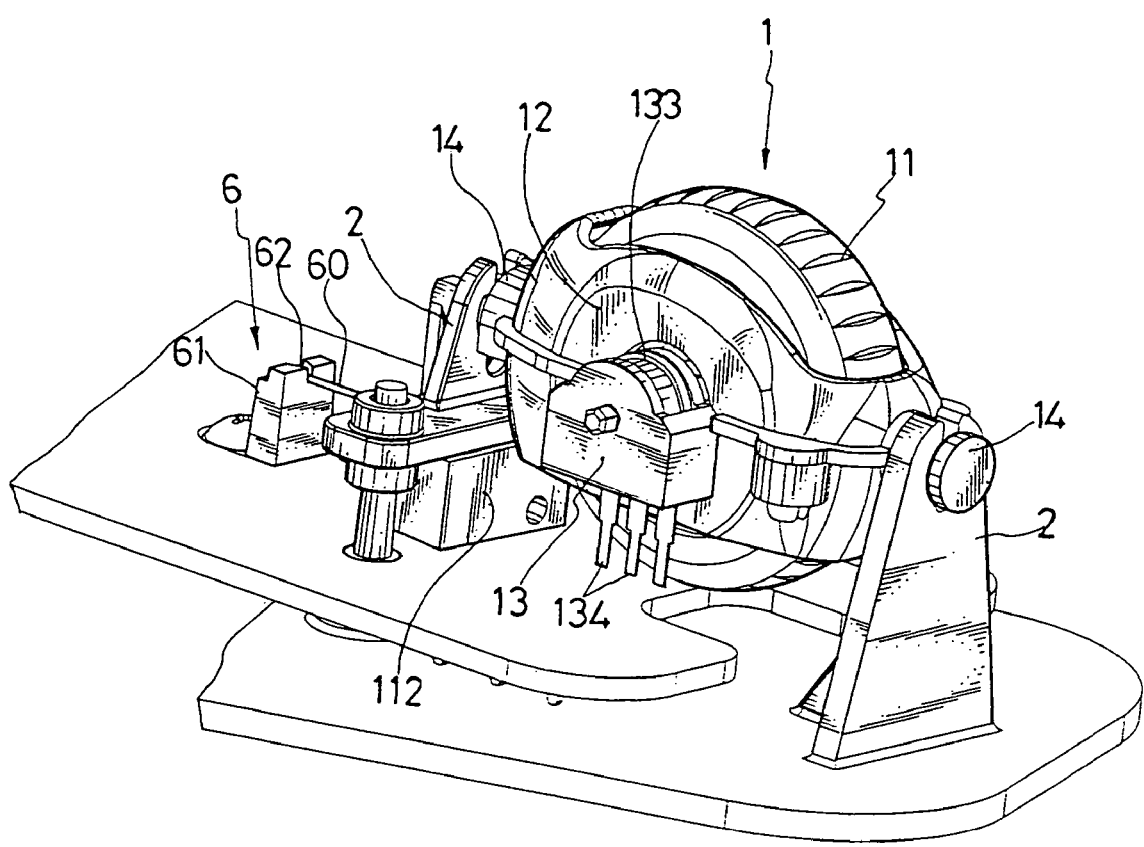
FIG. 3

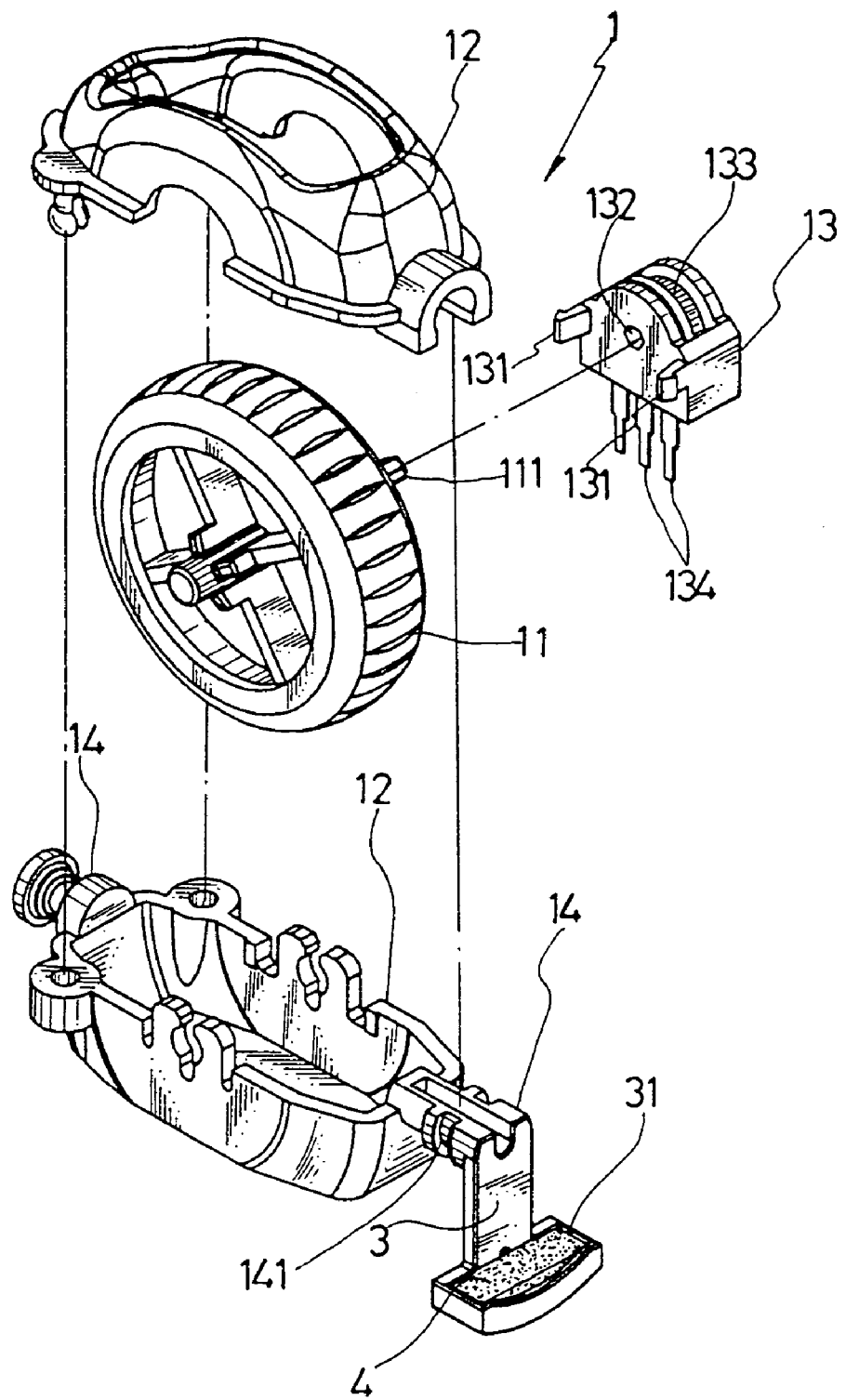
FIG. 4

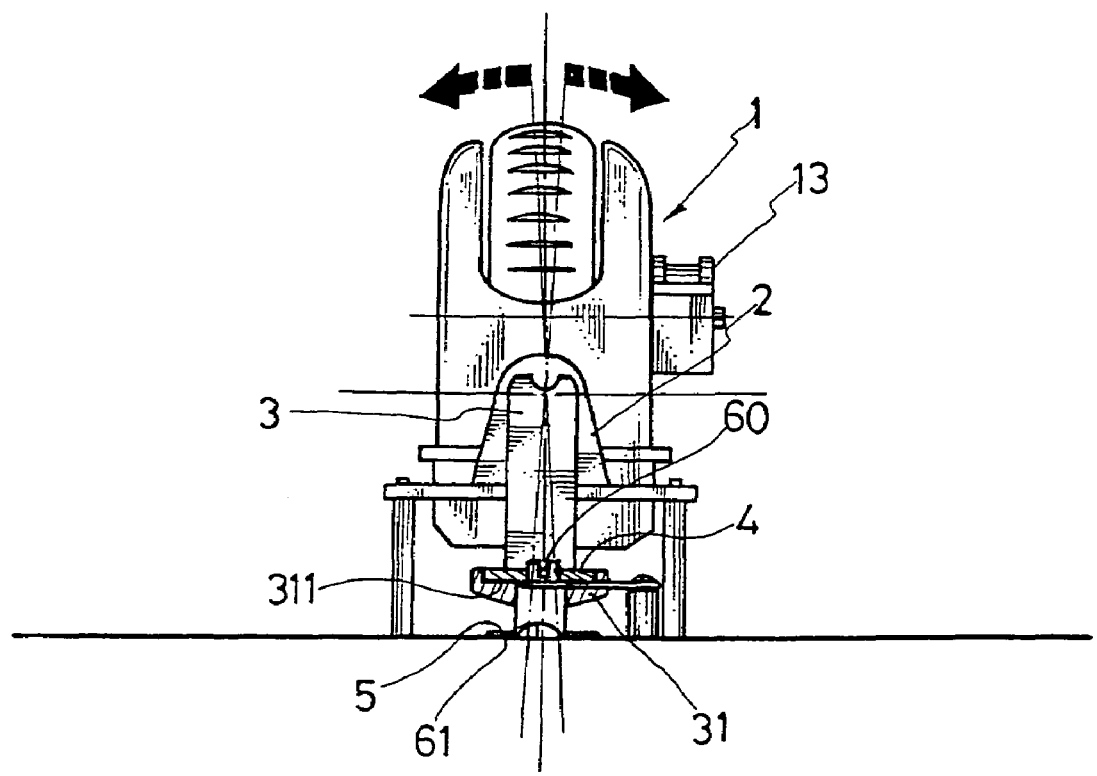
FIG. 5

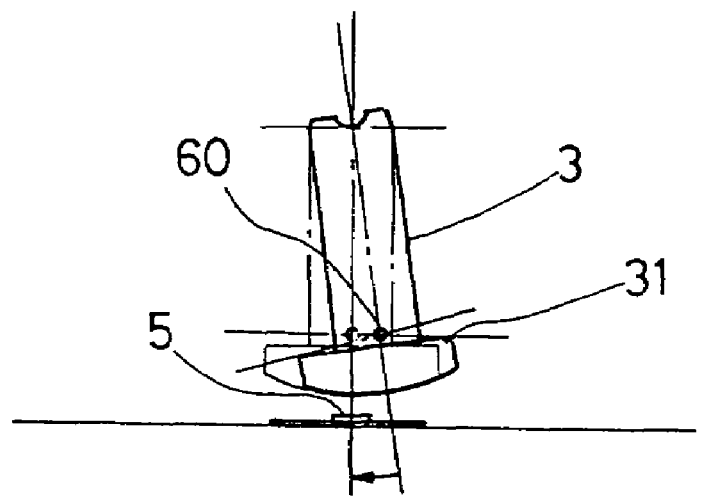
FIG. 6
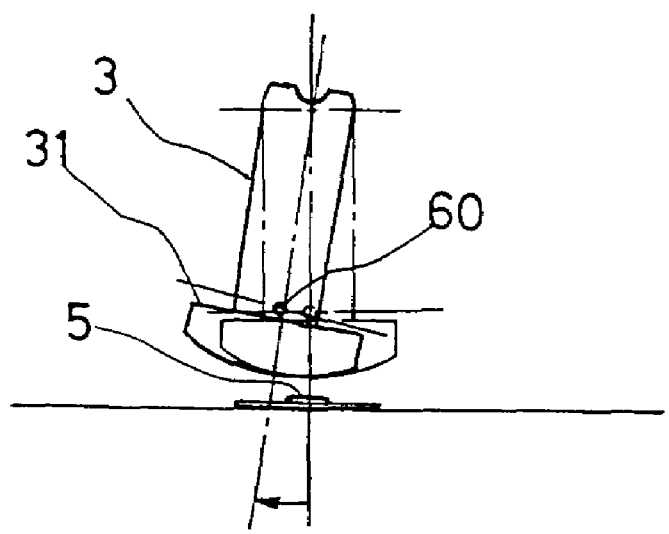
FIG. 7

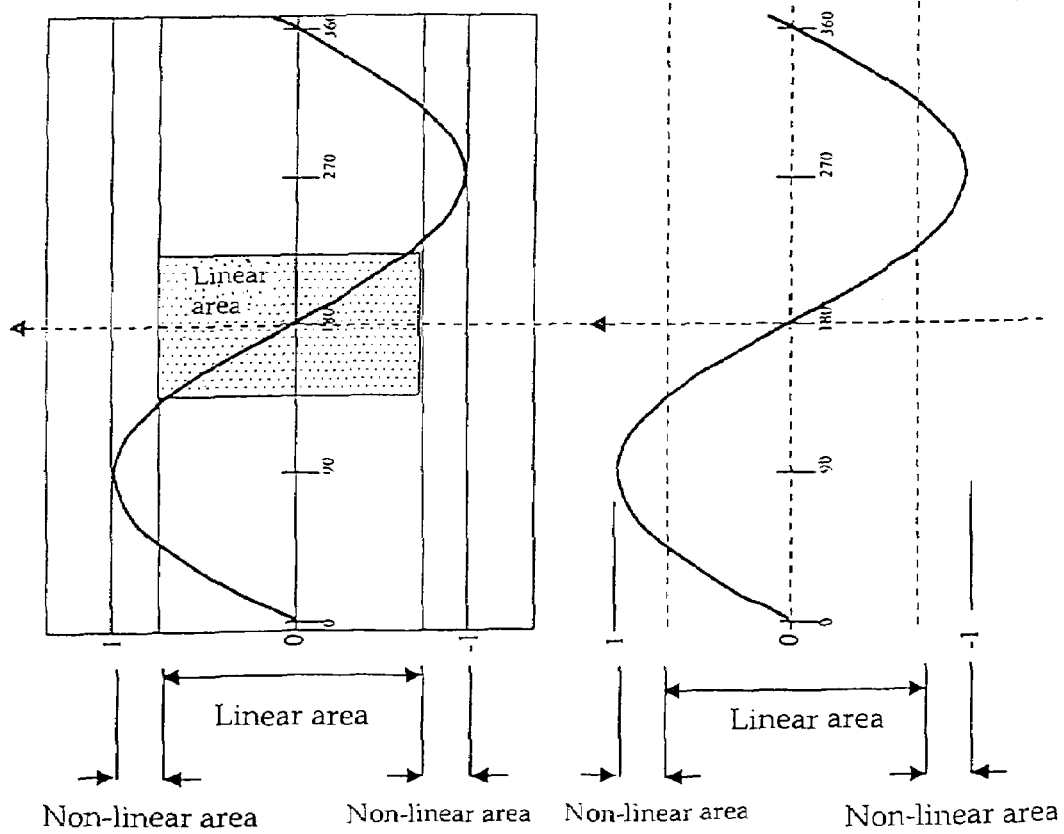
FIG. 8A  FIG. 8B  FIG. 8C

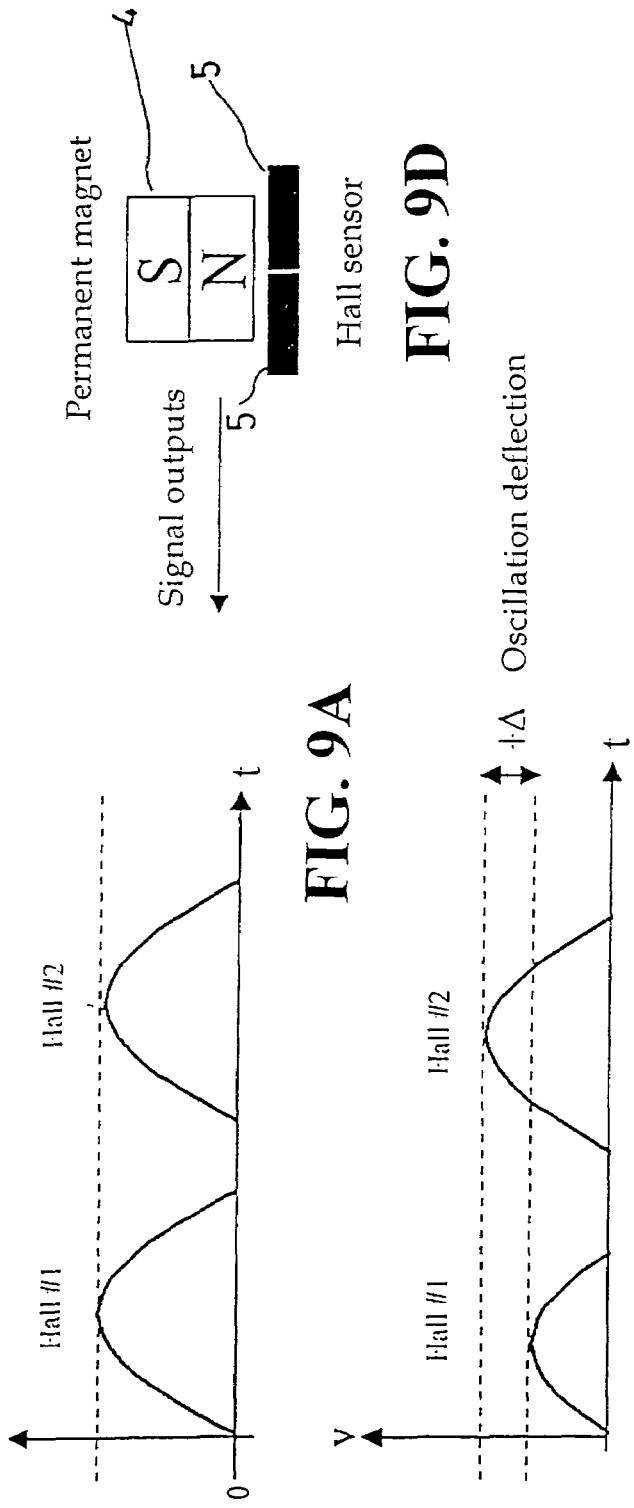

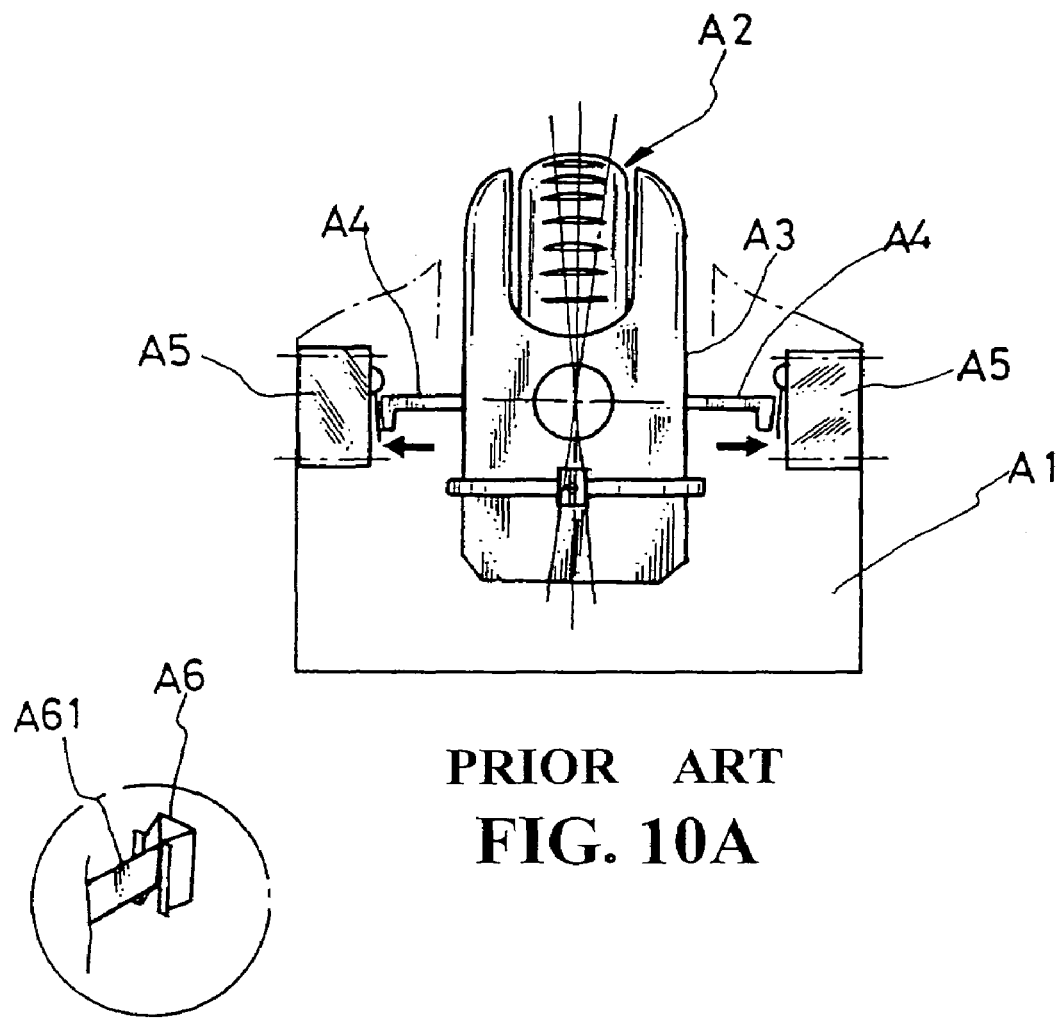
PRIOR ART
FIG. 10A
PRIOR ART
FIG. 10B

US 7,429,980 B2

OSCILLATION AND ROTATION METRIC CONTROLLER

BACKGROUND OF THE INVENTION (a) Technical Field of the Invention

The present invention is related to an oscillation and rotation metric controller, and more particularly, to one adapted with a knob switch encoder to a scrolling wheel mechanism to provide metric control functions by displacement of rotation.

(b) Description of the Prior Art

In the structure of a computer mouse of the prior art, a knob switch encoder is a must with its essential function to exercise rotation metric control over the scrolling wheel mechanism as a scroll bar. Up to now, the knob switch encoder when applied to a mouse is usually fixed to a circuit board and connected by a carrier from the scrolling wheel to exercise rotation control to longitudinally scroll pages displayed on the monitor.

The latest design of a mouse gives oscillation and rotation metric control to synchronously scroll pages laterally and longitudinally. As the knob-switch encoder gives the advantages of lower cost and easy access, how to apply it in the scrolling wheel mechanism for the latter to provide synchronous rotation metric control is the primary concern of the present invention.

Referring to FIG. 10A and FIG. 10A of the accompanying drawings, the latest design of a mouse is essentially comprised of a scrolling mechanism (A2) provided on a carrier (A1) and adapted with electronic circuit board, grating wheel and optical sensor to achieve rotation metric control by rotating the scrolling wheel clockwise or counter-clockwise. A pair of press bars (A4) respectively extends from both sides of an outer frame (A3) of the scrolling wheel mechanism (A2) at where in relation to two micro-switches (A5) respectively disposed on the left and the right inner walls of the carrier (A1). When the scrolling wheel mechanism (A2) swings to the left, it drives the press bar to touch the RH micro-switch (A5); and to the right, the LH micro-switch to execute oscillation metric control purpose.

As illustrated in FIG. 10, the return structure for the scrolling wheel mechanism (A2) is comprised of a clip (A6). The clip (A6) in conjunction with a central return tongue (A61) provides the return function. Wherein, when the scrolling wheel mechanism (A2) swings to its left or right, it delivers the counter elasticity to the clip (A6) to push the scrolling wheel mechanism (A2) in opposite direction to return to its original position. Furthermore, a torsion spring is used for the longitudinal return function for the scrolling wheel mechanism (A2). Generally, it takes two sets of different elastic members, the clip and the torsion spring, for the scrolling wheel mechanism to achieve lateral and longitudinal return, resulting in more complicated design and consuming too much time and efforts for the assembly. Therefore, the prior art is observed with the following defectives:

1. Problems with the touch mechanism. The design with the micro-switch is found with many problems including the presence of the action spacing, lower sensitivity and short service life are observed with the touch mechanism of the micro-switch.

2. Greater force needed to touch the micro-switch. This makes the operation uncomfortable putting the design of the touch micro-switch under serious criticism and trial.

3. The limited mechanical service life. Any failure or poor contact due to tear and wear of any micro-switch will frustrate the control and operation, or even prevent the micro-switch useless, thus to shorten the service life of the oscillation metric control structure that essentially operates on the micro-switch.

4. Higher production cost and more workstations in the assembly. With the comparatively more precise and complicated design of grating wheel and optical sensor, significant increase of total production is taken for granted.

5. Larger power consumption. The optical sensor has LED as the light-emitting source that consumes more power to frustrate the power saving-design requirement.

6. Elastic fatigue. The clip used for the return of the scrolling wheel mechanism is vulnerable to elasticity fatigue resulting in greater clamping space to negatively affect the control.

7. Less competitive. Both of the clip and the torsion spring used for the return structure of the scrolling wheel mechanism damages the competition advantages of the product due to that more types of components and higher materials and production costs are required.

SUMMARY OF THE INVENTION

The primary purpose of the present invention is to provide an oscillation and rotation metric controller that achieves lateral oscillation metric control mechanism by retrieving changes of signals in magnetic filed produced by a permanent magnet adapted to a scrolling wheel mechanism.

Another purpose of the present invention is to provide an oscillation and rotation metric controller that generates signals of rotation waveform by a knob switch encoder to exercise synchronous oscillation with the scrolling wheel mechanism.

Yet another purpose of the present invention is to provide an oscillation and rotation metric controller that is adapted with a return structure using a spring to control the scrolling wheel mechanism for lateral and longitudinal return functions at the same time.

To achieve the purposes, the present includes knob-switch encoder for the rotation metric control, Hall sensor and permanent magnet for oscillation, and a simple spring for return to provide the following advantages: Production cost & power consumption reduction. In the present invention, a knob switch encoder fixed to and synchronously operating along with the oscillation of the scrolling wheel mechanism to replace the optical design of the prior art for the rotation metrical control.

Installation of the Hall sensor and the permanent magnet change the mechanical operation of the prior art into electronic operation without being subject to the service life of the switch thus to significantly increase the service life and reduce the production cost.

The present invention provides metric control of the direction of oscillation as found with the prior art operating on micro-switch, and of the amount of oscillation as well by retrieving and processing through programs installed in a microprocessor the signals of changed magnetic field.

Adjustable sensitivity of operation. Whereas the present invention provided metric control over both of the amount and direction of oscillation, the sensitivity of the oscillation can be setup or adjustment programmed. Signals from the magnetic field are consistent without being subject to interference from external noises, thus to provide consistent, reliable and precise control.

In the present invention, only an elastic return stick penetrating the return construction is used and control the dancer in the scrolling wheel mechanism. Consequently, all the operation of the scrolling wheel mechanism returning to its original position as drawn by the elasticity of the elastic return stick to allow simple design, low production cost, and accurate and reliable return efficacy.

The present invention allows the adjustment of the volume and size of related devices in conjunction with the updated electronic manufacturing technology depending on the application of the information productions requiring metric and control.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 1 is a perspective view of the present invention.

FIG. 2 is a schematic view showing a construction of a dancer in the present invention.

FIG. 3 is a side view of the present invention.

FIG. 4 is an exploded view of a scrolling wheel mechanism in the present invention.

FIG. 5 is a schematic view showing a front view of the present invention.

FIG. 6 is a schematic view showing that the dancer in the present invention swings to its right.

FIG. 7 is a schematic view showing that the dancer in the present invention swings to its left.

FIGS. 8A, 8B and 8C are schematic views showing a permanent magnet and a Hall sensor in a first preferred embodiment of the present invention.

FIGS. 9A, 9B, 9C and 9D are schematic views showing a permanent magnet and a Hall sensor in a second preferred embodiment of the present invention.

FIGS. 10A and 10B are schematic views showing a lateral control construction of a metric controller of the prior art.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIG. 1, the present invention is essentially comprised of a scrolling wheel mechanism (1), an expansion base (2), a dancer (3), a permanent magnet (4), a Hall sensor (5), and a return structure (6).

As illustrated in FIGS. 3 and 4, the scrolling wheel mechanism (1) is comprised of a scrolling wheel (11), a case (12) covering up the scrolling wheel (11), and a knob-switch encoder (13). Wherein, two insertion bits (131) respectively extending from the encoder (13) to fix the encoder (13) to one side of the case (12). A rolling shaft (111) extending from the central pivot hole (132) provided on the encoder (13) penetrates to connect and control an inner rotor (133) disposed in the encoder (13). Signals outputted from the revolution are transmitted to a circuit board (not illustrated) connected to a terminal (134) extending from where below the encoder (13). The operation mode of the encoder (13) features the coding signals of the rotation generated by the revolution of the scrolling wheel (11) including oscillation amount and direction are judged by operation programs installed in a microprocessor to achieve the purpose of rotation metric control.

A pivot (14) is each provided in front and in rear of the scrolling wheel mechanism (1) as illustrated in FIGS. 1 and 3, and both pivot (14) respectively strides over and moveably pivoted into a locking slot (21) disposed in the front and rear expansion bases (2) for the entire scrolling wheel mechanism (1) to provide the lateral and longitudinal control functions at the same time.

Now referring to FIGS. 2 and 5, the dancer (3) and the pivots (14) are integrated with the scrolling wheel mechanism (1). A pendulum (31) is connected to where below the dancer (3). A trough (311) is provided inside the pendulum (31) to accommodate the permanent magnet (4) to synchronously oscillate with the dancer. The oscillation of the permanent magnet (4) in the trough (311) generates signals of changed magnetic field to be retrieved by the Hall sensor (5) disposed below the permanent magnet (4). Signals retrieved are then processed by the microprocessor to achieve the metric control of oscillation direction and amount.

As illustrated in FIG. 3, both pivots (14) respectively provided in front and rear of the scrolling wheel mechanism (1) stride over and movably pivoted to the respective locking slots (21) disposed in the front and the rear expansion bases (2). Wherein, the rear expansion base (2) is provided with a construction for executing longitudinal movement for the scrolling wheel mechanism to touch a micro-switch (112) disposed below the rear expansion base (2).

The return structure (6) as illustrated in FIG. 1 has an elastic return stick (60) secured in position in a key of a basic plate (61), a guide channel (62) of the basic plate (61) leads the elastic return stick (60) to align at and connected to the dancer (3) for providing the check purpose of elastic return thus for the elastic return stick (60) to synchronous oscillate with the dancer (3). As illustrated in FIG. 5, in the absence of externally applied force, the elastic return stick (6) constantly stays in the central position of return. As illustrated in FIGS. 6 and 7, when a force is externally applied for the scrolling wheel mechanism (1) to execute lateral oscillation, and the dancer (3) drives the elastic return stick (60) to be compressed. As the external force disappears, the elastic return stick (60) has its return force to drive the scrolling wheel mechanism (1) to return to its original position. Similarly, when the external force is applied on the scrolling wheel mechanism (1) for longitudinal operation, the dancer (3) also drives the elastic return stick (60) to be compressed. When the external force disappears, the elastic return stick (60) returns to drive the scrolling wheel mechanism (1) to return to its original position. Accordingly, the elastic return stick (60) allows the scrolling wheel mechanism (1) to execute lateral and longitudinal return purposes.

A first preferred embodiment and a second preferred embodiment of the present invention as respectively illustrated in FIGS. 8A, 8B, 8C and FIGS. 9A, 9B, 9C and 9D are adapted with the permanent magnet (4) and the Hall sensor (5). In FIGS. 8A, 8B, 8C and 8D, the magnetic poles of the permanent magnet (4) are laterally arranged in N-S- or S-N;

or alternatively polarities of multiple pairs are arranged in N-s or S-N. The Hall sensor (5) is provided at where below the permanent magnet (4) to retrieve signals of changed magnetic field generated as the permanent magnet (1) oscillates with the waveform of the oscillation signals as illustrated in FIGS. 8A, 8B, 8C and 8D. Wherein, signals falling within the linear area of the waveform relate to the optimal sampling signals of oscillation amount. Continuous signals of sampling are used to generate positive or negative oscillation deflection in the judgment of the oscillation direction.

As illustrated in FIGS. 9A, 9B, 9C and 9D, poles of the permanent magnet (4) are longitudinally arranged in NS or SN, a pair of Hall sensors (5) are disposed below the permanent magnet (4) to retrieve signals of changed magnetic field produced as the permanent magnet (4) oscillates with the oscillation signal waveform as shown in FIGS. 9A, 9B, 9C and 9D. Continuous signals of sampling are used to generate positive or negative oscillation deflection in the judgment of the oscillation amount and direction.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. An oscillation and rotation metric controller includes a scrolling wheel mechanism, an expansion base, a dancer, a permanent magnet, a Hall sensor, and a return structure; the scrolling wheel mechanism comprised of a scrolling wheel, a case covering up the scrolling wheel, and a knob-switch encoder; two bits extending from both sides of the encoder to be engaged to one side of a cover; a central pivot hole in the encoder connecting to a rolling shaft extending sideway from the scrolling wheel to control the encoder to generate rotation signal waveform; a pivot being each provided to a front and a rear of the scrolling wheel mechanism; both pivots striding over and moveably pivoted to respective locking slots disposed in the front and the rear expansion bases; the scrolling wheel mechanism moving longitudinally to touch a microswitch provided below the expansion base; a dancer integrated with the pivots of the scrolling wheel mechanism, the dancer being connected below a pendulum, and a trough being provided in the pendulum to accommodate the permanent magnet; oscillation of the scrolling wheel mechanism synchronously driving the permanent magnet to generate oscillation signals of changed magnetic field to achieve oscillation metric control; the return structure being provided to where the dancer of the scrolling wheel mechanism is located; an elastic return stick being provided to the return structure and fixed to a key of a basic plate; and a guide channel provided on the basic plate leading the return stick to extend and penetrate through the dancer.

2. The oscillation and rotation metric controller of claim 1; wherein, poles of the permanent magnet or multiple pairs of poles are laterally arranged in NS or SN, and a single Hall sensor is provided at where below the permanent magnet.

3. The oscillation and rotation metric controller claim 1; wherein, poles of the permanent magnet or multiple pairs of poles are longitudinally arranged in NS or SN, and a pair of Hall sensors are provided at where below the permanent magnet.

* * * * *